US011383639B1

(12) United States Patent
Kwon

(10) Patent No.: US 11,383,639 B1
(45) Date of Patent: Jul. 12, 2022

(54) ILLUMINATION APPARATUS OF DRIVER AIR BAG

(71) Applicant: HYUNDAI MOBIS CO., LTD., Seoul (KR)

(72) Inventor: Oh Koang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/337,101

(22) Filed: Jun. 2, 2021

(30) Foreign Application Priority Data

Mar. 9, 2021 (KR) .................. 10-2021-0030744

(51) Int. Cl.
*B60Q 3/283* (2017.01)
*B60Q 3/80* (2017.01)
*B60R 21/2165* (2011.01)
*B60Q 3/64* (2017.01)

(52) U.S. Cl.
CPC .............. *B60Q 3/283* (2017.02); *B60Q 3/64* (2017.02); *B60Q 3/80* (2017.02); *B60R 21/21656* (2013.01)

(58) Field of Classification Search
CPC ...... B60Q 3/283; B60Q 3/60–68; B60Q 3/80; B60R 21/21656
See application file for complete search history.

(56) References Cited

U.S. PATENT DOCUMENTS 10,272,869 B2 * 4/2019 Kanto ................. B60Q 1/0082
2010/0194080 A1 * 8/2010 Paxton ............. B60R 21/21656
280/728.3

FOREIGN PATENT DOCUMENTS

| DE | 112014000598 T5 | 8/2014 |
| KR | 20120044831 A | 5/2012 |
| WO | 2010051090 A1 | 5/2010 |
| WO | 2010087931 A1 | 8/2010 |

* cited by examiner

*Primary Examiner* — Jason M Han
(74) *Attorney, Agent, or Firm* — NovoTechIP International PLLC

(57) ABSTRACT

The present invention relates to an illumination apparatus in which a light source module 100 is mounted on a steering wheel 10, an illumination element 200 is mounted on a driver airbag cover 20, and the light of the light source module 100 is transmitted to the illumination element 200 through an optical fiber 300. When the driver airbag cushion is deployed due to an accident, it is possible to prevent the scattering of the light source module 100, thereby preventing injuries to the passengers due to the light source module 100, simplifying the structure of the driver airbag cover 20 and achieving weight reduction.

14 Claims, 11 Drawing Sheets

ILLUMINATION APPARATUS OF DRIVER AIR BAG

CROSS-REFERENCE TO RELATED APPLICATION

This application claims priority from Korean Patent Application No. 10-2021-0030744, filed on Mar. 9, 2022, in the Korean Intellectual Property Office, the disclosure of which is incorporated herein by reference in its entirety.

BACKGROUND OF THE INVENTION

1. Field of the Invention

The present invention relates to an illumination apparatus of a driver airbag, more particularly, a technology directed to an illumination apparatus of a driver airbag configured to transmit light from a light source module mounted on a steering wheel to an illumination element mounted on a driver airbag cover through an optical fiber.

2. Description of the Related Art

As a measure to protect the safety of vehicle occupants, various types of airbag devices are provided in the vehicle, and among them, a driver airbag device is mounted on a steering wheel.

The driver airbag device receives a control signal from an airbag control unit, and when an inflator explodes, an airbag cushion protrudes from a steering wheel and is deployed toward a driver by the pressure of the airbag gas injected from the inflator. Accordingly, it is configured to protect the driver's upper body with the deployed airbag cushion.

On the other hand, there is a technology for increasing the sense of luxury of a vehicle by installing an illumination device on the driver airbag cover and by providing a sense of illumination through the driver airbag cover with the illumination device.

That is, this is a case in which a sense of illumination is added to the emblem of a vehicle manufacturer installed on the driver airbag cover, or a case in which a decorative element having a specific shape is installed on the driver airbag cover and a sense of illumination is added to the decorative element through an illumination device.

However, if an accident occurs while a driver airbag cover is equipped with an illumination device, the driver airbag cover is damaged by the deployment pressure of an airbag cushion and is separated from an airbag module, and the illumination device mounted on the driver airbag cover is also separated and scattered. In addition, there is a disadvantage in that injuries to passengers (drivers) are increased due to the scattered illumination device.

In order to prevent the scattering of the illumination device in the event of an accident, there is a structure in which a departure prevention strap connecting the steering wheel and the illumination device is applied. In this way, the structure in which the illumination device is connected with the strap incurs additional cost, and in particular, the structure is complicated as the installation space of the strap must be secured separately.

The matters described as the background art are only for enhancing an understanding of the background of the present invention, and should not be taken as acknowledging that they correspond to the prior art already known to those of ordinary skill in the art.

SUMMARY OF THE INVENTION

The present invention is related to an illumination apparatus in which a light source module is mounted on a steering wheel, an illumination element is mounted on a driver airbag cover, and the light of the light source module is transmitted to the illumination element through an optical fiber. The object of the present invention is to prevent scattering of the light source module mounted on the steering wheel in the event of an accident so that injuries to passengers (drivers) due to the light source module can be prevented.

In addition, the present invention is a configuration in which only an illumination element and an optical fiber are fixed to a driver airbag cover, and another object of the present invention is to simplify the structure of the driver airbag cover and reduce weight.

In order to achieve the objects above, an illumination apparatus of a driver airbag includes a light source module that is fixed to a steering wheel, an illumination element that is fixed to a driver airbag cover assembled to the steering wheel, and an optical fiber that transmits light from the light source module to the illumination element.

The light source module is fixedly mounted on a remote control unit of the steering wheel separated from the driver airbag cover.

The light source module includes an LED light source that is installed by penetrating a remote control unit housing provided on the steering wheel, and a PCB that is fixed to the remote control unit housing and is electrically connected to the LED light source to control on/off of the LED light source.

A protrusion is formed to protrude on an inner surface of the driver airbag cover, an engraved groove is formed in the protrusion, and the optical fiber is inserted and fixed in the engraved groove.

The illumination element is a plurality of transparent elements for transmitting light that is fixed to the driver airbag cover so as to be exposed in a form of dots through a front of the driver airbag cover.

The transparent element has one end connected to the optical fiber inside the driver airbag cover, and the other end exposed to the front by penetrating the driver airbag cover. A reflector is provided to reflect and direct the light of the optical fiber between the one end and the other end at a predetermined angle.

The reflector has a reflective surface of an aluminum deposition surface or a reflective paint surface.

The optical fiber penetrates a side surface of the driver airbag cover, and one end faces and is spaced apart from the LED light source and the other end is connected to the transparent element by one-to-one matching.

The LED light source and the optical fiber are composed of multiple having the same number and are arranged in a line, a first rib is formed to protrude in the remote control unit housing so as to prevent light interference between the LED light sources, a second rib is formed to protrude in the side surface of the driver airbag cover so as to prevent light interference between the optical fibers, and in a state in which the LED light sources and the optical fibers face each other one to one, the first and second ribs are located to be alternately overlapped along one direction.

The optical fiber is an end lighting optical fiber that emits light at an end connected to the transparent element.

The illumination element is an illumination emblem that is fixed to the driver airbag cover so as to be exposed through a front of the driver airbag cover.

The illumination emblem is injection-coupled with the driver airbag cover and three-dimensionally protruded from the driver airbag cover.

The optical fiber is a side lighting optical fiber that is integrally connected along a pattern of the illumination emblem on an inner surface of the driver airbag cover and emits and directs light in a length direction.

In addition, in an illumination apparatus of a driver airbag according to the present invention, a LED light source is fixedly mounted on a remote control unit separated from a driver airbag cover on a steering wheel, either a transparent element that is a dot-shaped and is capable of transmitting light or an illumination emblem is fixedly mounted on the driver airbag cover, and light of the LED light source is transmitted to the transparent element or the illumination emblem using an optical fiber.

The optical fiber is fixed by being inserted into an engraved groove formed on an inner surface of the driver airbag cover.

The illumination apparatus according to the present invention is a configuration in which a light source module is mounted on a steering wheel, an illumination element is mounted on a driver airbag cover, and the light of the light source module is transmitted to the illumination element through an optical fiber. As the light source module is mounted on the steering wheel separated from the driver airbag cover, it is possible to prevent scattering of the light source module when the driver airbag cushion is deployed due to an accident, and thereby preventing injuries to passengers (drivers) due to the light source module.

In addition, the illumination apparatus according to the present invention is a configuration in which only an illumination element and an optical fiber are fixed to a driver airbag cover, and there is an effect to simplify the structure of the driver airbag cover and reduce weight.

DETAILED DESCRIPTION OF THE PREFERRED EMBODIMENTS

Figure 1:
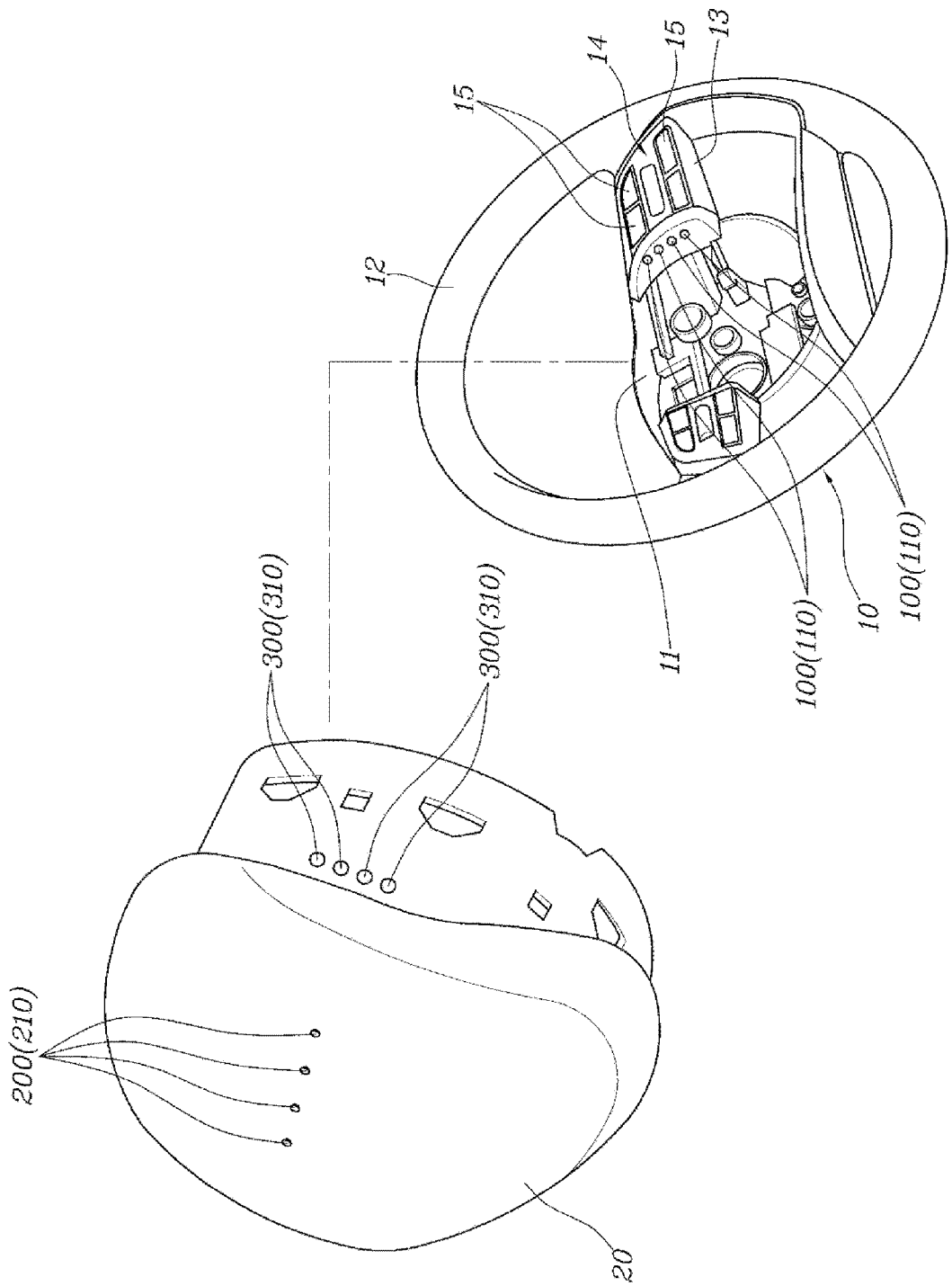
FIG. 1 is a diagram illustrating a state in which a driver airbag cover is separated from a steering wheel and explaining an illumination apparatus of a driver airbag according to the present invention.
Figure 2:
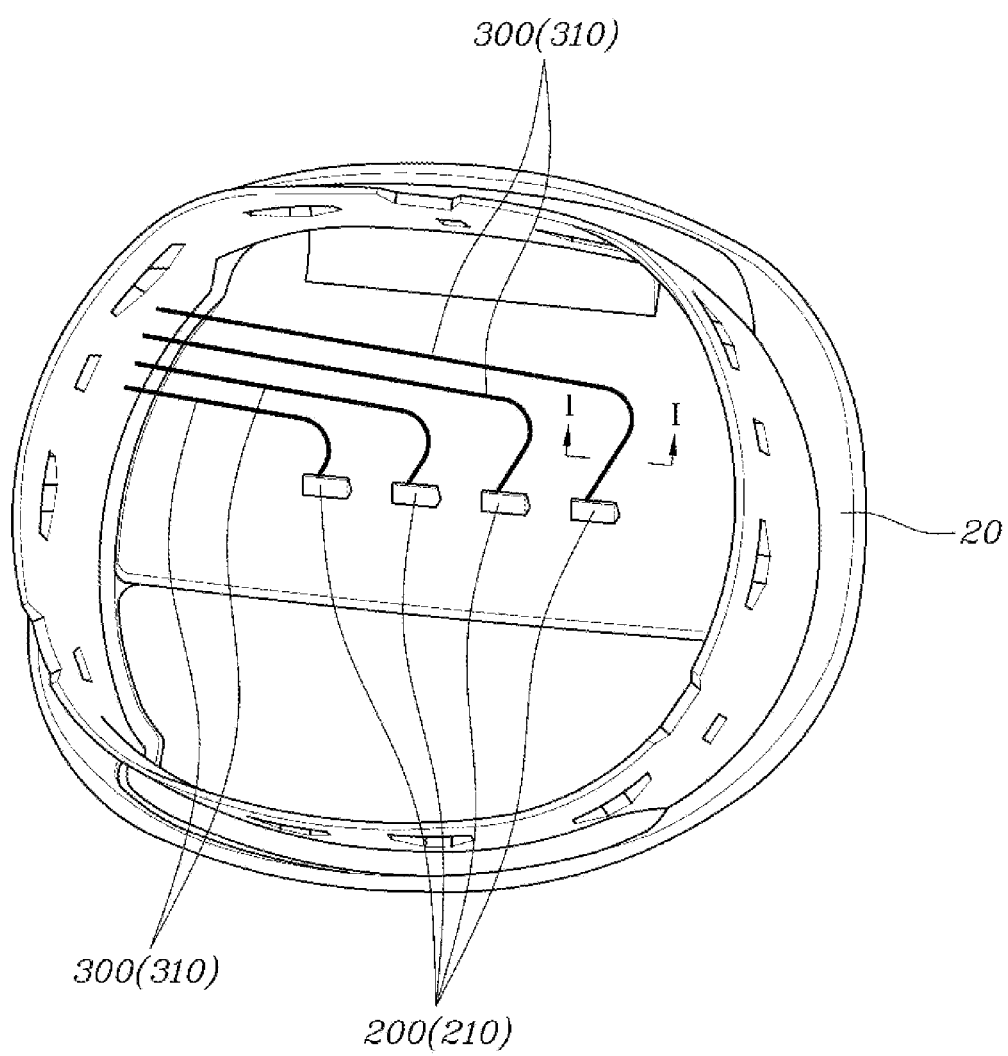
FIG. 2 is a diagram of the driver airbag cover of FIG. 1 as viewed from an inside.
Figure 3:
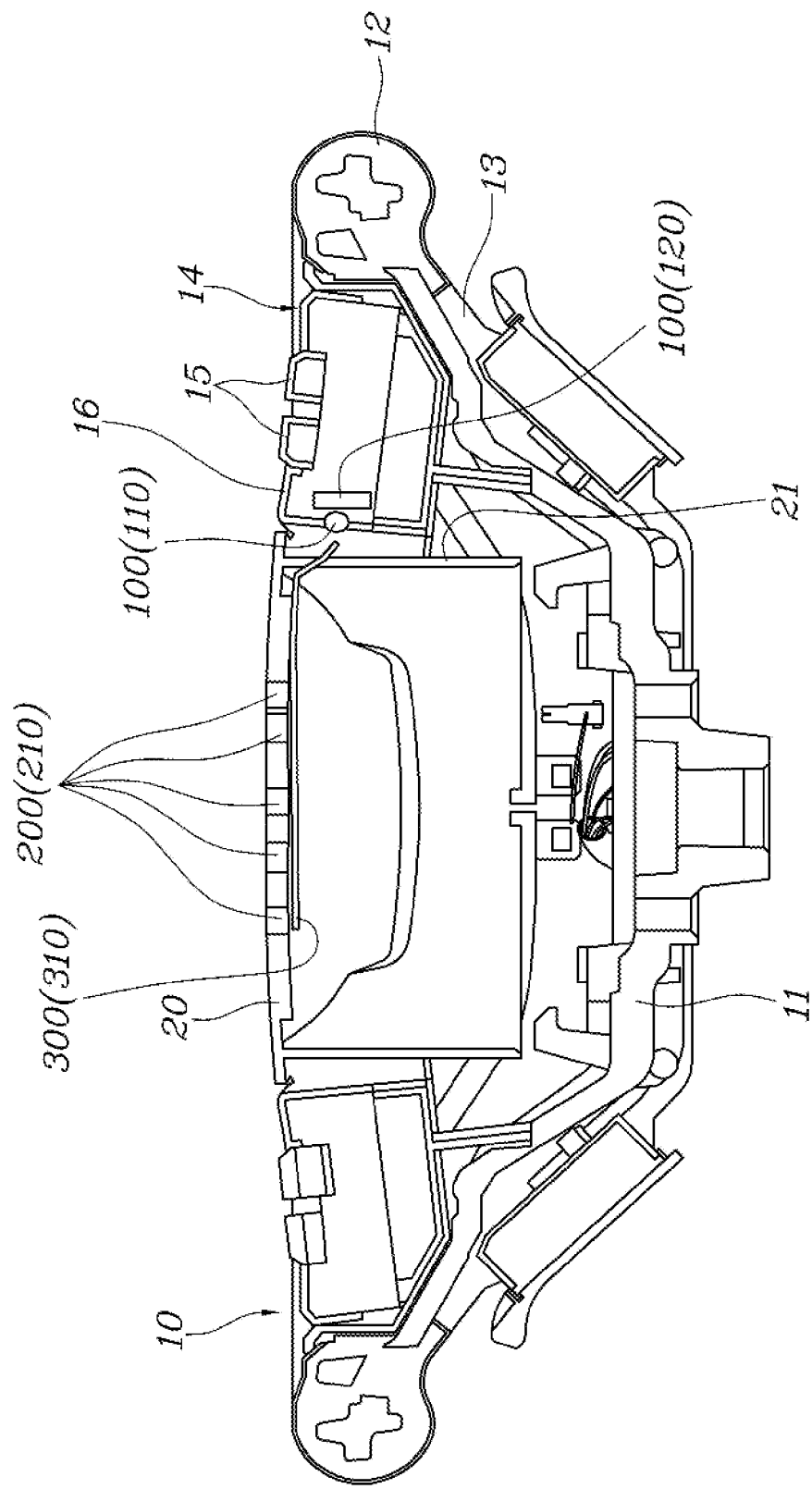
FIG. 3 is a cross-sectional diagram of the combined state of FIG. 1.
Figure 4:
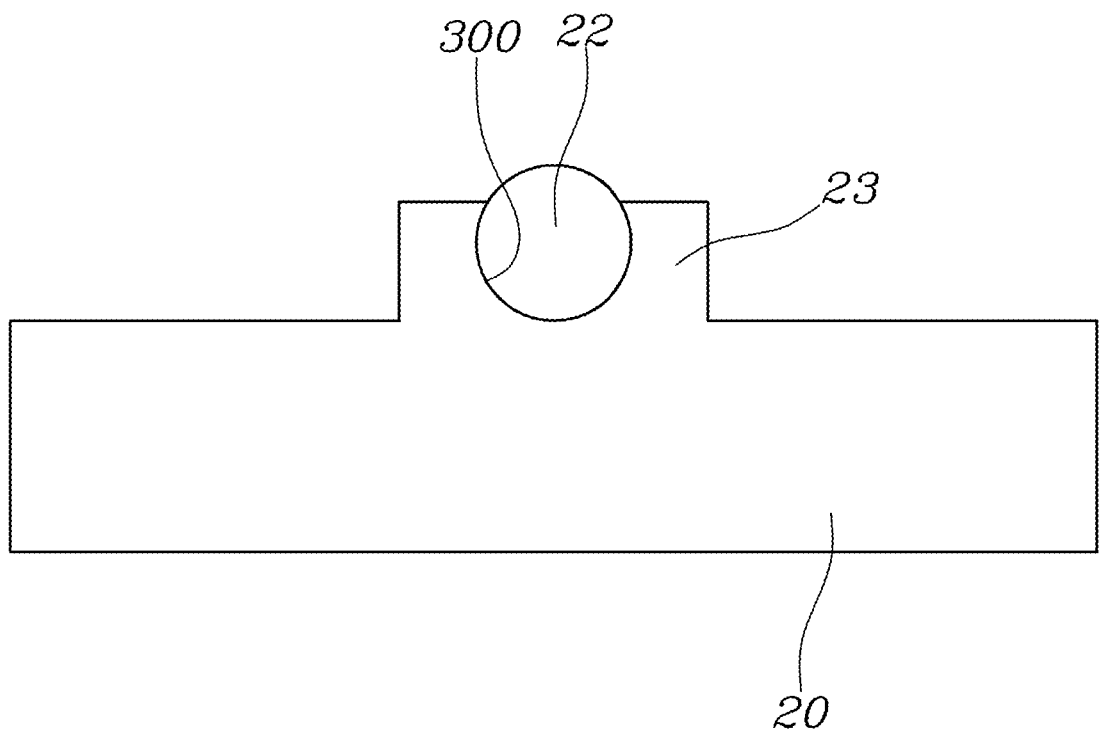
FIG. 4 is a cross-sectional diagram taken along line I-I of FIG. 2.
Figure 5:
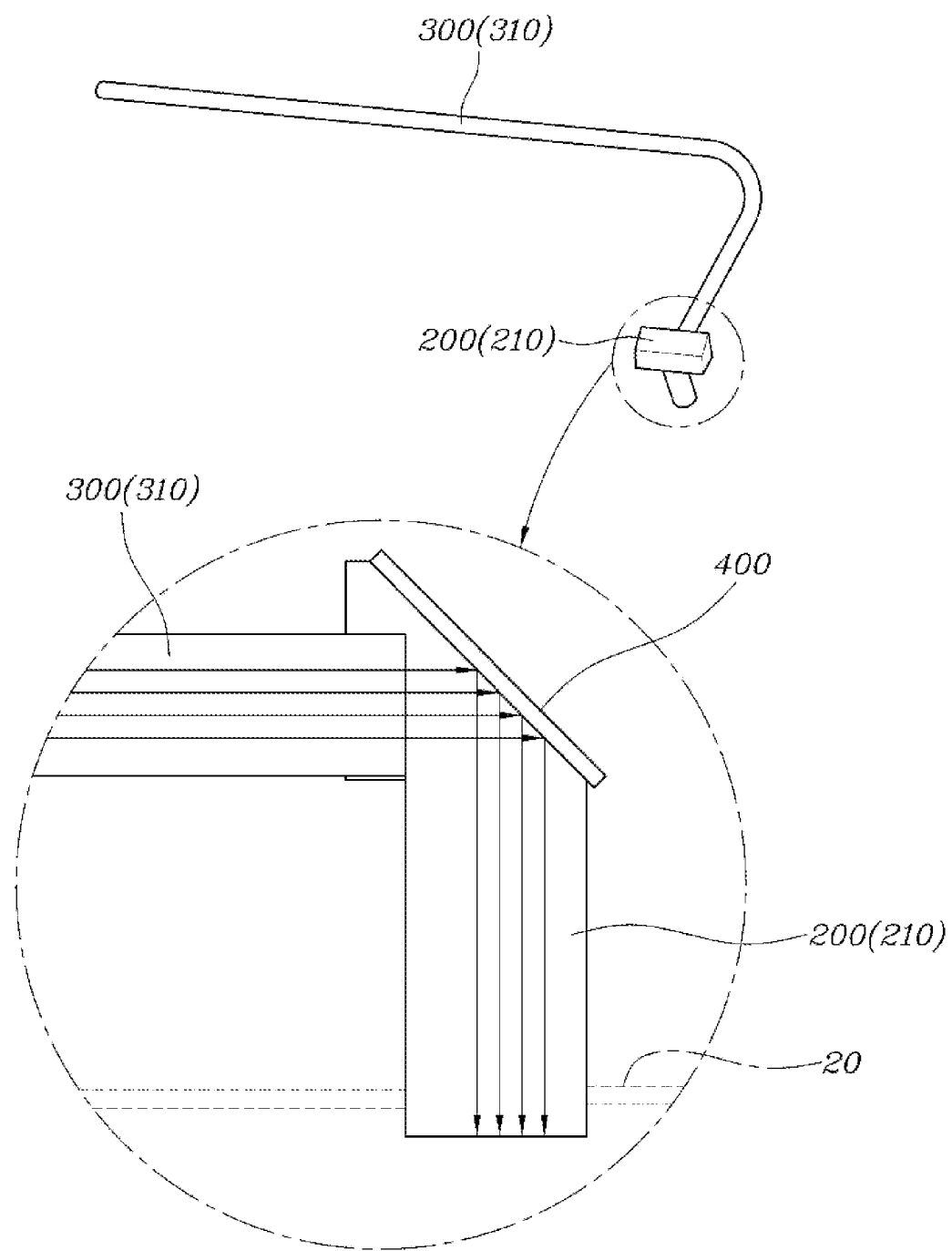
FIG. 5 is a diagram illustrating a state in which one end of an optical fiber is connected to an illumination element equipped with a reflector according to the present invention.
Figure 6:
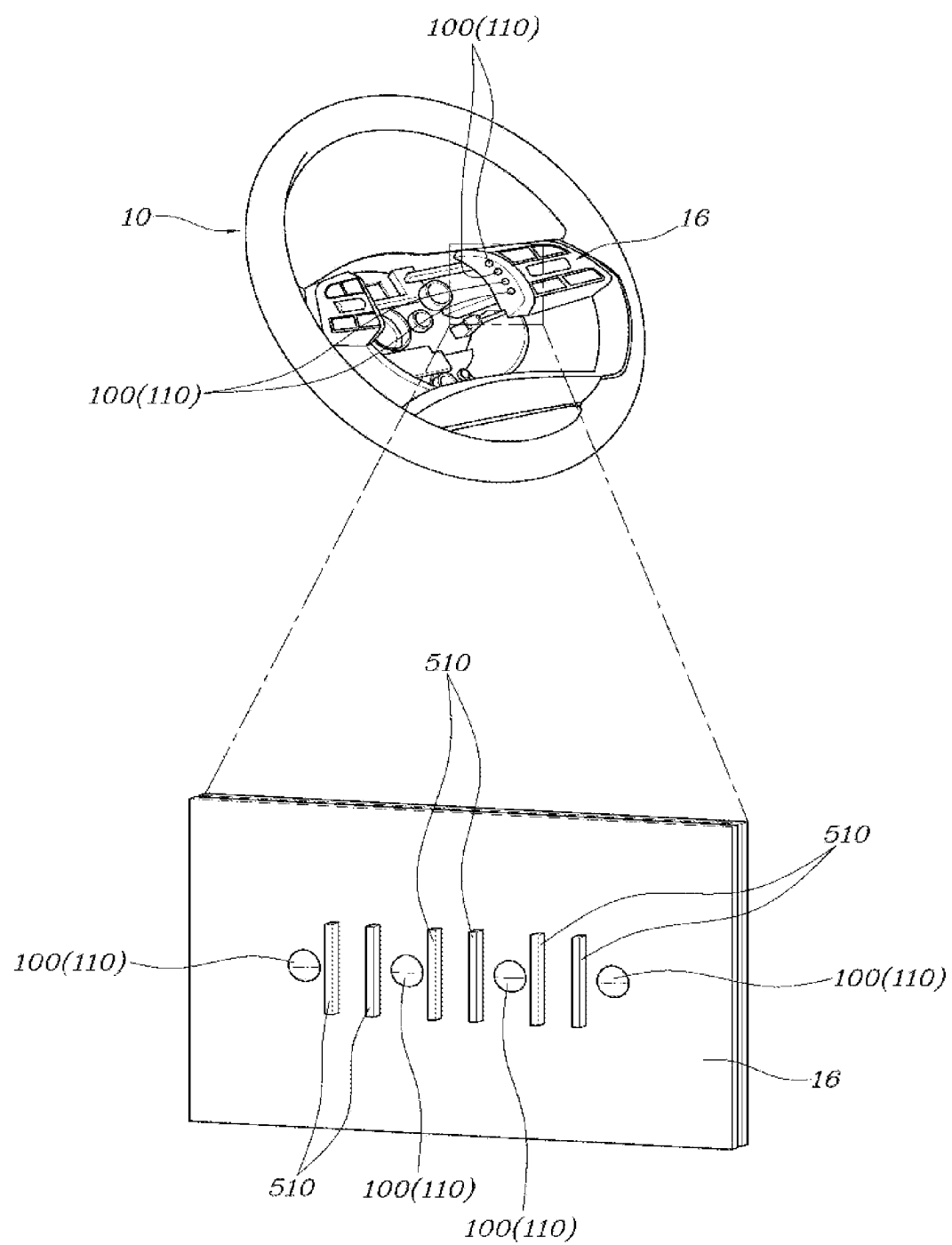
FIG. 6 is a diagram explaining a first rib formed in a remote control unit housing according to the present invention.
Figure 7:
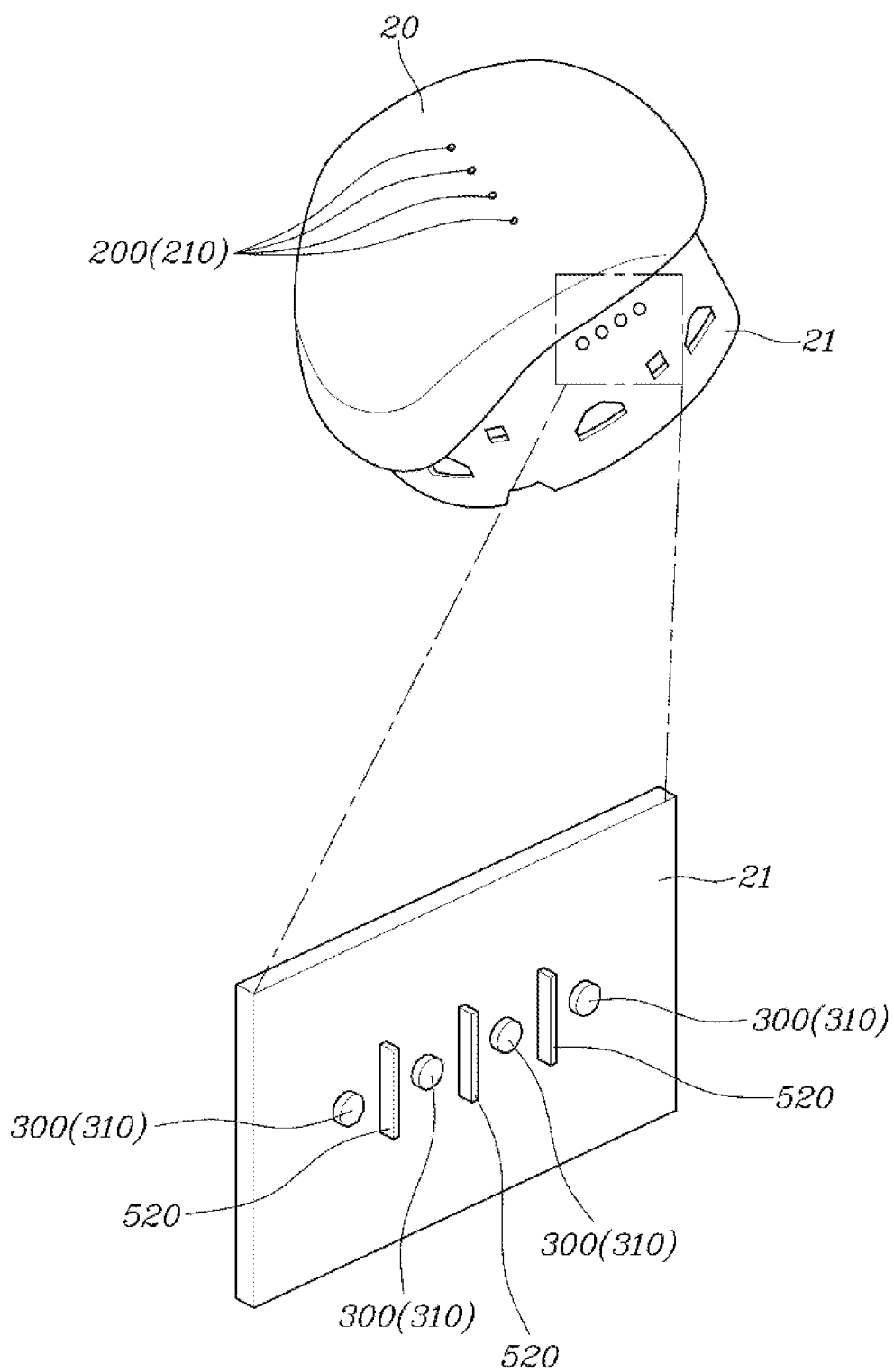
FIG. 7 is a diagram explaining a second rib formed on a side surface of a driver airbag cover according to the present invention.
Figure 8:
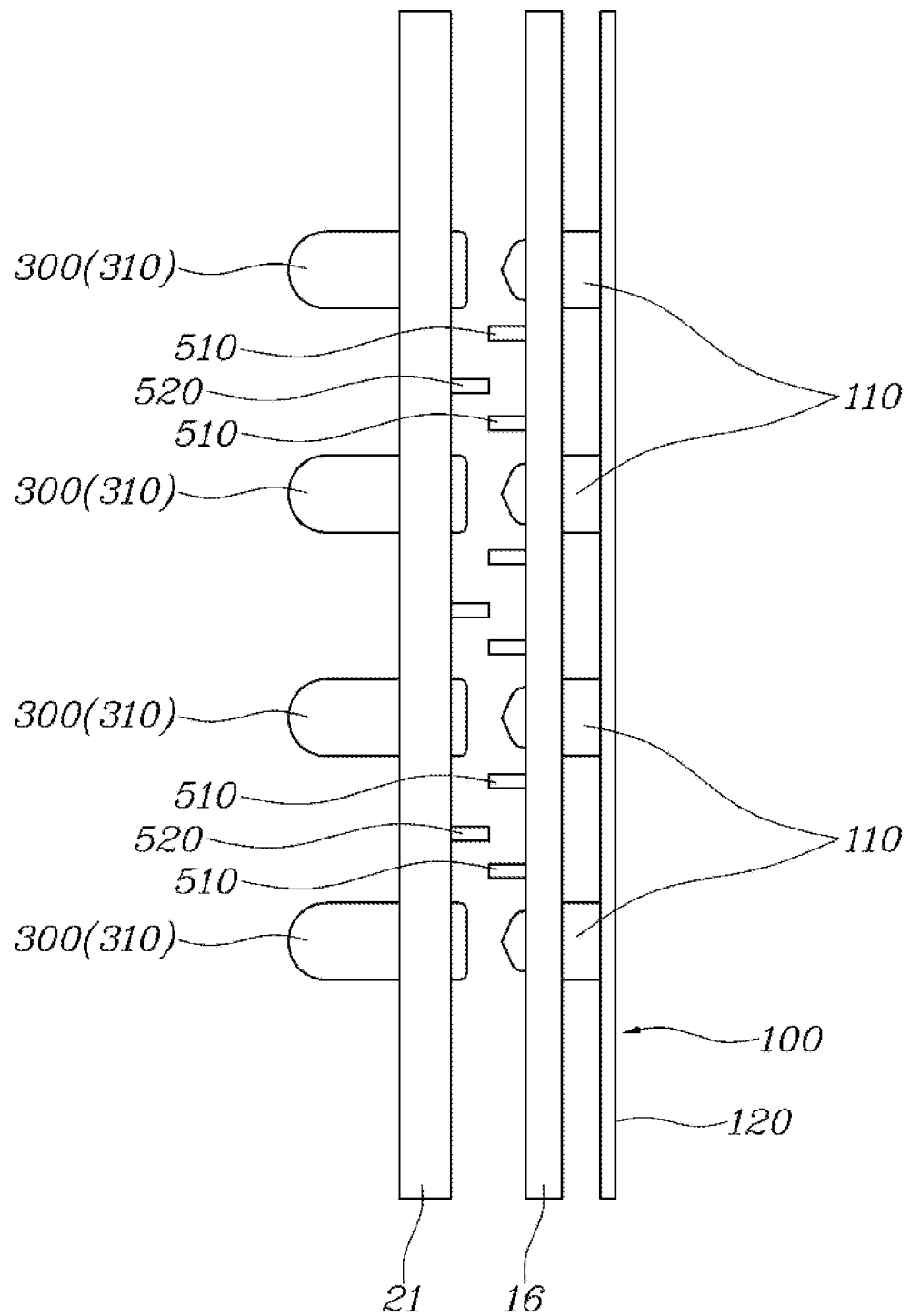
FIG. 8 is a plan diagram illustrating a positional relationship between a first rib and a second rib according to the present invention.
Figure 9:
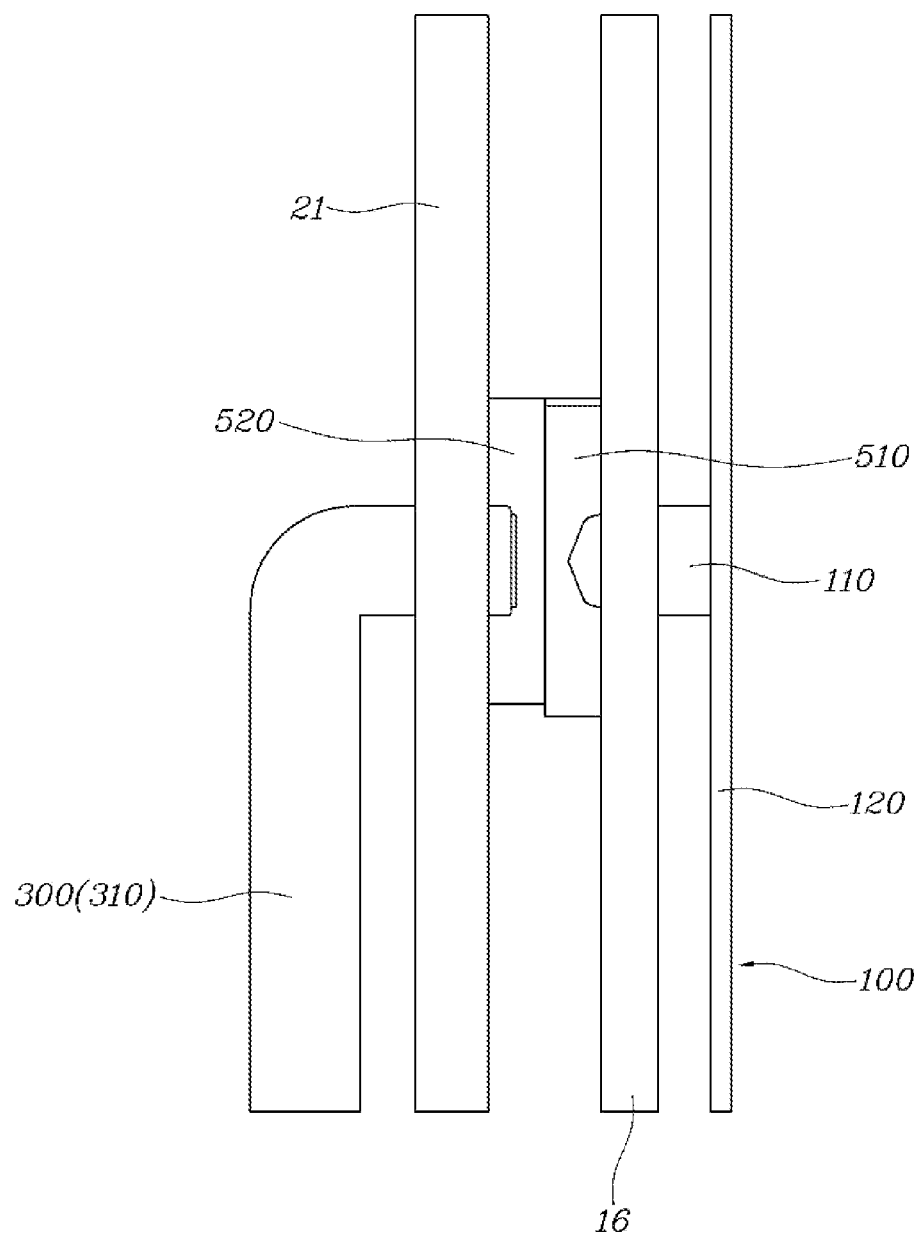
FIG. 9 is a front diagram of FIG. 8.

Specific structural or functional descriptions of the embodiments of the present invention disclosed in this specification or application are exemplified only for the purpose of describing the embodiments according to the present invention, and the embodiments according to the present invention are implemented in various forms, and should not be construed as being limited to the embodiments described in this specification or application.

Since the embodiments according to the present invention can be modified in various ways and have various forms, specific embodiments are illustrated in the drawings and will be described in detail in the present specification or application. However, this is not intended to limit the embodiments according to the concept of the present invention to a specific form of disclosure, it should be understood that all changes, equivalents, and substitutes included in the spirit and scope of the present invention are included.

Terms such as first and second may be used to describe various components, but the components should not be limited by the terms. The above terms are only for the purpose of distinguishing one component from other components, for example, without departing from the scope of the rights according to the concept of the present invention, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present invention. Singular expressions include plural expressions unless the context clearly indicates otherwise. In the present specification, terms such as "comprise" or "have" are intended to designate the existence of a specified feature, number, step, action, component, part, or combination thereof, and one or more other features or numbers. It is to be understood that the presence or additional possibility of the presence or addition of, steps, actions, components, parts, or combinations thereof is not preliminarily excluded.

Unless otherwise defined, all terms used herein, including technical or scientific terms, have the same meaning as commonly understood by one of ordinary skill in the art to which the present invention belongs. Terms such as those defined in a commonly used dictionary should be interpreted as having a meaning consistent with the meaning of the related technology, and should not be interpreted as an ideal or excessively formal meaning unless explicitly defined in the present specification.

A control unit (controller) according to an exemplary embodiment of the present invention may be implemented through an algorithm configured to control the operation of various components of a vehicle, a nonvolatile memory (not shown) configured to store data related to a software command for reproducing the algorithm, or a processor (not shown) configured to perform an operation described below using the data stored in the corresponding memory. Here, the memory and the processor may be implemented as separate chips. Alternatively, the memory and processor may be implemented as a single chip integrated with each other. The processor may take the form of one or more processors.

Hereinafter, an illumination apparatus of a driver airbag according to a preferred embodiment of the present invention will be described with reference to the accompanying drawings.

An illumination apparatus of a driver airbag according to the present invention will be described with reference to FIGS. 1 to 11.

A steering wheel 10 of a vehicle includes a hub 11 at the center, a rim 12 at an outer border, and a spoke 13 connecting the hub 11 and the rim 12.

A driver airbag housing is fixed to the hub 11 of the steering wheel 10, an inflator and a folded airbag cushion are installed in the airbag housing, and a driver airbag cover 20 is coupled to the airbag housing to cover the airbag cushion.

When an accident occurs and the inflator is operated and airbag gas is generated, the airbag cushion is deployed under the pressure of the airbag gas. The tear line of the driver airbag cover 20 is torn during the deployment of the airbag cushion, and, as the airbag cushion is deployed toward the driver through the torn tear line, the driver is protected by the deployed airbag cushion.

The illumination apparatus of the driver airbag according to the present invention includes a light source module 100 that is fixed to the steering wheel 10, an illumination element 200 that is fixed to the driver airbag cover 20 assembled to the steering wheel 10, and an optical fiber 300 that transmits the light of the light source module 100 to the illumination element 200. The illumination element 200 may be a decorative element.

The light source module 100 is fixedly mounted on a remote control unit 14 of the steering wheel 10 separated from the driver airbag cover 20.

When an accident occurs and the driver airbag cushion is deployed, the driver airbag cover 20 is damaged and broken by the deployment pressure of the airbag cushion.

Therefore, when the light source module 100 is installed in the driver airbag cover 20, the light source module 100 is damaged and scattered together with the driver airbag cover 20, which is damaged in the event of an accident, and the passenger (driver) may be injured by the scattering light source module 100. In order to prevent this, the present invention has a structure in which the light source module 100 is installed in the remote control unit 14 of the steering wheel 10 separated from the driver airbag cover 20.

In this way, if the light source module 100 is installed in the remote control unit 14 of the steering wheel 10, even if the driver airbag cover 20 is damaged in an accident, the light source module 100 can be prevented from being damaged and scattered. Through this, there is an advantage in that injuries to passengers caused by the light source module 100 can be eliminated as much as possible.

The remote control unit 14 of the steering wheel 10 is a portion where various switches 15 that the driver can manipulate are located, and is typically provided on the spoke 13 of the steering wheel 10.

The light source module 100 according to the present invention includes an LED light source 110 that is installed by penetrating a remote control unit housing 16 provided on the steering wheel 10, and a Printed Circuit Board (PCB) 120 that is fixed to the remote control unit housing 16 and is electrically connected to the LED light source 110 to control on/off of the LED light source 110.

A through hole is formed on a side surface of the remote control unit housing 16, and the LED light source 110 is inserted into the through hole of the remote control unit housing 16 to be fixedly installed. The PCB 120 is fixedly installed on the remote control unit housing 16 so as to locate in an inner space of the remote control unit housing 16.

A protrusion 2123 is formed to protrude on the inner surface of the driver airbag cover 20, an engraved groove 22 is formed in the protrusion 2123, and the optical fiber 300 is inserted into the engraved groove 22 to be a fixed structure.

An embodiment according to the present invention is a structure in which only the illumination element 200 emitting light and the optical fiber 300 transmitting light are installed on the driver airbag cover 20, and the light source module 100 constituting the illumination apparatus is not installed in the driver airbag cover 20. Thus, there is an advantage that the structure of the driver airbag cover 20 can be simplified and lightened.

The illumination element 200 according to the present invention may be a plurality of transparent elements 210 for transmitting light that is fixed to the driver airbag cover 20 so as to be exposed in a dot form through a front of the driver airbag cover 20. The transparent elements 210 may be decorative elements.

One end of the transparent element 210 is connected to the optical fiber 300 inside the driver airbag cover 20, and the other end of the transparent element 210 penetrates the driver airbag cover 20 and is exposed to the front. A reflector 400 may be provided to reflect and direct the light of the optical fiber 300 between one end and the other end at a predetermined angle.

The light direction of the LED light source 110 transmitted to the transparent element 210 through the optical fiber 300 is changed through the reflector 400 and emitted to the front of the driver airbag cover 20.

In order to improve the reflectance of the reflector 400, an aluminum deposition surface or a reflective paint surface may be a reflective surface of the reflector 400.

The optical fiber 300 penetrates the side surface 21 of the driver airbag cover 20, and thus, one end faces and is spaced apart from the LED light source 110, and the other end is connected to the transparent element 210 by one-to-one matching.

When the illumination element 200 is composed of a plurality of transparent elements 210 for transmitting light, the LED light source 110 and the optical fiber 300 are composed of multiple having the same number as shown in FIGS. 6 to 9 so that they are arranged in a line. In the remote control unit housing 16, a first rib 510 is formed to protrude in order to prevent light interference between the LED light sources 110. On the side surface 21 of the driver airbag cover 20, a second rib 520 is formed to protrude in order to prevent light interference between the optical fibers. In a state in which the LED light sources 110 and the optical fibers 300 face each other one to one, the first rib 510 and the second rib 520 have a structure in which they are located to be alternately overlapped along one direction. Accordingly, the light interference between adjacent LED light sources 110 can be eliminated.

When the illumination element 200 is composed of a plurality of transparent elements 210 for transmitting light, the optical fiber 300 may be an end lighting optical fiber 310 emitting light at the end connected to the transparent element 210. Through this, it is possible to further enhance the high-end image by the transparent element 210 exposed in the form of dots at the front of the driver airbag cover 20.

Figure 10:
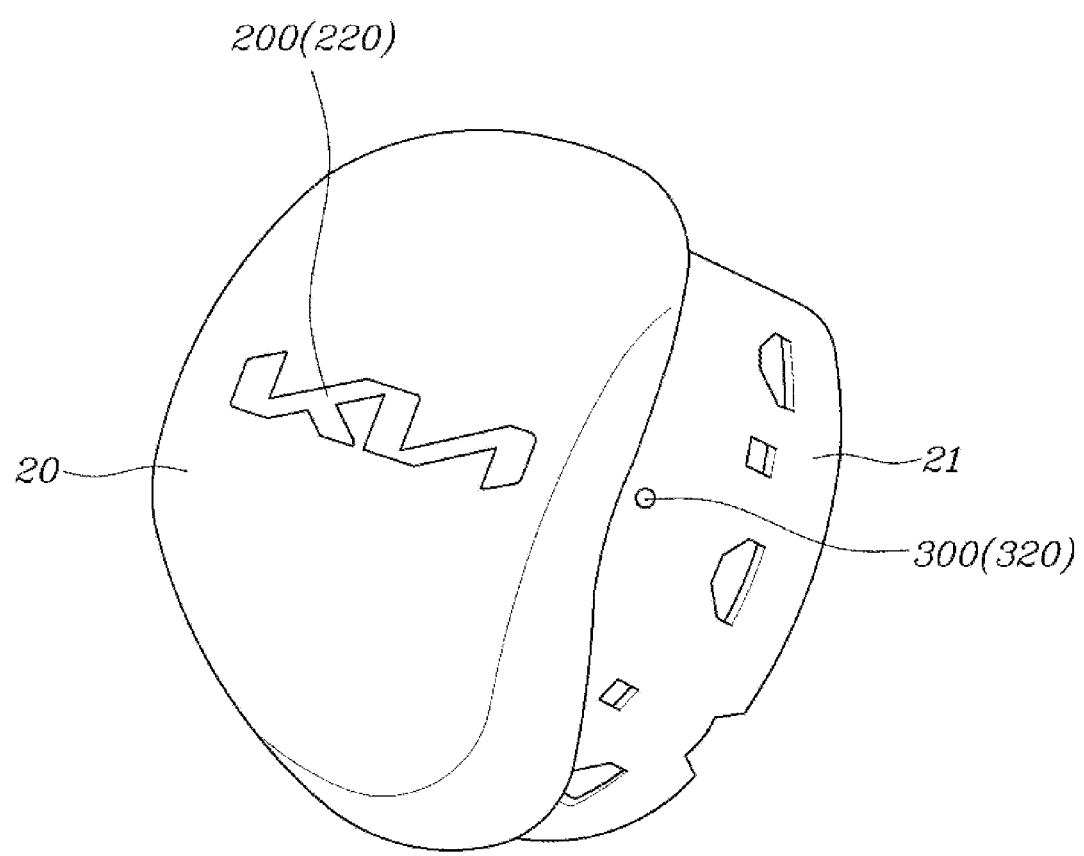
FIG. 10 is a diagram of a driver airbag cover combined with an illumination emblem according to another embodiment of the present invention.
Figure 11:
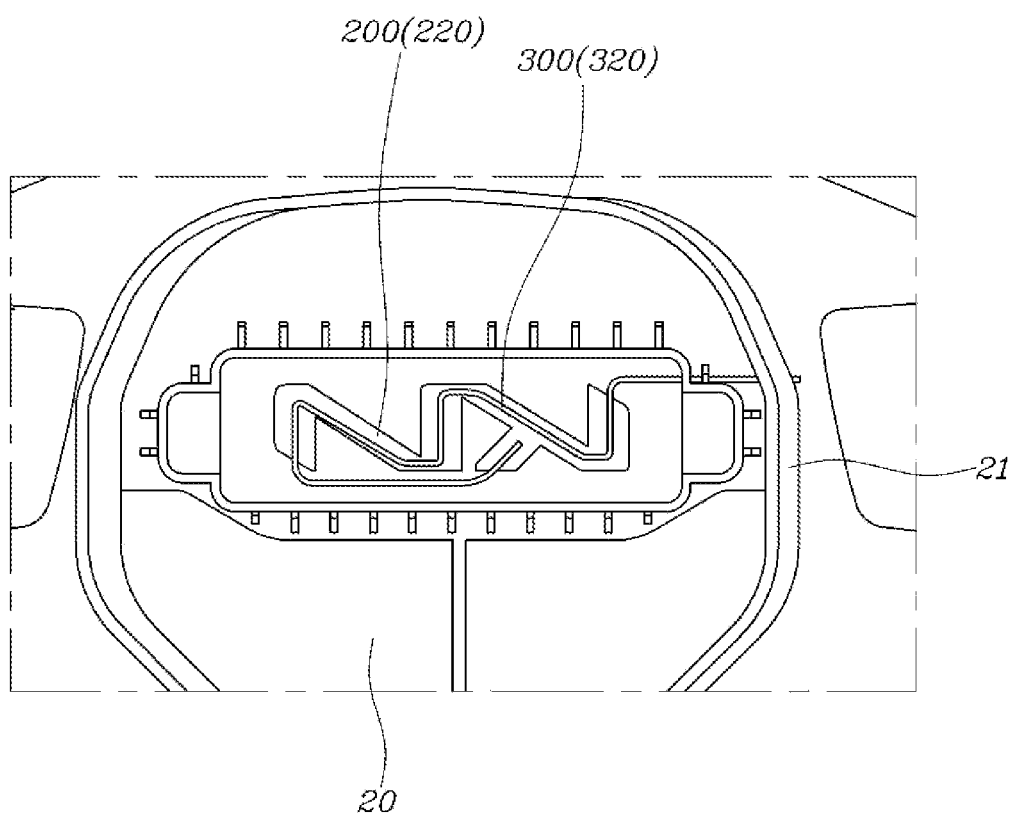
FIG. 11 is a diagram of the driver airbag cover of FIG. 10 as viewed from an inside.

Another example of the illumination element 200 may be an illumination emblem 220 fixed to the driver airbag cover 20 so as to be exposed through the front of the driver airbag cover 20 as shown in FIGS. 10 to 11.

When the illumination element 200 is composed of the illumination emblem 220, the illumination emblem 220 is injection-coupled with the driver airbag cover 20 and is protruded three-dimensionally from the driver airbag cover 20, thereby forming a three-dimensional illumination emblem 220. Accordingly, it is possible to further enhance the high-end image.

In addition, when the illumination element 200 is composed of the illumination emblem 220, the optical fiber 300 may be a side lighting optical fiber 320 that is integrally connected along the pattern of the illumination emblem 220 on the inner surface of the driver airbag cover 20, and emits and directs light along the length direction. Through this, the high-end image can be further enhanced through the illumination emblem 220 that emits three-dimensional light from the front of the driver airbag cover 20.

As described above, in the illumination apparatus of the driver airbag according to the present invention, the light source module 100 is mounted on the steering wheel 10, the illumination element 200 is mounted on the driver airbag cover 20, and the optical fiber 300 is configured so that the light of the light source module 100 is transmitted to the illumination element 200. Thus, as the light source module 100 is mounted on the steering wheel 10 separated from the driver airbag cover 20, when the driver airbag cushion is deployed due to an accident, the scattering of the light source module 100 can be prevented, and there is an advantage of preventing injuries to passengers (drivers) by the light source module 100.

In addition, the illumination apparatus of the driver airbag according to the present invention is configured so that only the illumination element 200 and the optical fiber 300 are fixed to the driver airbag cover 20. Thus, it has the advantage of simplifying and lightening the structure of the driver airbag cover 20.

Although the present invention has been illustrated and described in connection with specific embodiments, it will be obvious to those of ordinary skill in the art that the present invention can be variously improved and changed within the scope of the technical spirit of the present invention provided by the following claims.

What is claimed is:

1. An illumination apparatus, comprising:
    a light source module coupled to a steering wheel and configured to emit light;
    an illumination element coupled to a driver airbag cover attached to the steering wheel; and
    an optical fiber configured to transmit the light emitted from the light source module to the illumination element,
    wherein the light source module comprises:
        an LED light source penetrating a remote control unit housing positioned on the steering wheel; and
        a PCB disposed at the remote control unit housing, electrically coupled to the LED light source and configured to control turning on/off of the LED light source.

2. The apparatus of claim 1, wherein the light source module is coupled to a remote control unit of the steering wheel, and the remote control unit is separate from the driver airbag cover.

3. The apparatus of claim 1, further comprising:
    a protrusion extending from an inner surface of the driver airbag cover; and
    an engraved groove formed in the protrusion,
    wherein the optical fiber is disposed at the engraved groove.

4. The apparatus of claim 1, wherein the illumination element comprises a plurality of transparent elements configured to transmit light, coupled to the driver airbag cover and exposed in a shape of dots through a front portion of the driver airbag cover.

5. The apparatus of claim 4, wherein:
    the transparent element has a first end portion connected to the optical fiber within the driver airbag cover and the a second end portion extending to the front portion of the driver airbag cover, and
    the apparatus further comprises a reflector configured to reflect and direct the light transmitted by the optical fiber between the first and second end portions of the transparent element at a predetermined angle.

6. The apparatus of claim 5, wherein the reflector has a reflective aluminum deposition surface or a reflective paint surface.

7. The apparatus of claim 4, wherein:
    the optical fiber penetrates a side surface of the driver airbag cover, and
    the optical fiber has a first end portion facing and spaced apart from the LED light source and a second end portion connected to the transparent element.

8. The apparatus of claim 7, wherein:
    the LED light source and the optical fiber comprise a same number of multiple elements arranged in a line, and
    the apparatus further comprises:
        a first rib protruding in the remote control unit housing and configured to prevent light interference between the multiple elements of the LED light source; and
        a second rib protruding in the side surface of the driver airbag cover and configured to prevent light interference between the multiple elements of the optical fiber,
    wherein, in a state in which the multiple elements of the LED light source and optical fiber face each other one to one, the first and second ribs are located to alternately overlap each other along one direction.

9. The apparatus of claim 4, wherein the optical fiber comprises an end lighting optical fiber configured to emit the light and connected to the transparent element.

10. The apparatus of claim 1, wherein the illumination element comprises an illumination emblem disposed at the driver airbag cover and exposed through a front portion of the driver airbag cover.

11. The apparatus of claim 10, wherein the illumination emblem is injection-coupled with the driver airbag cover and three-dimensionally protrudes from the driver airbag cover.

12. The apparatus of claim 10, wherein the optical fiber comprises a side lighting optical fiber integrally connected along a pattern of the illumination emblem on an inner surface of the driver airbag cover and configured to emit and direct light in a length direction.

13. An illumination apparatus of a driver airbag in which an LED light source is coupled to a remote control unit separated from a driver airbag cover arranged on a steering wheel, wherein:
- either a transparent element having a dot shape or an illumination emblem is coupled to the driver airbag cover,
- light emitted from the LED light source is transmitted to the transparent element or the illumination emblem through an optical fiber,
- the LED light source penetrating a remote control unit housing positioned on the steering wheel, and
- a PCB disposed at the remote control unit housing, electrically coupled to the LED light source and configured to control turning on/off of the LED light source.

14. The apparatus of claim 13, wherein the optical fiber is positioned at a groove formed on an inner surface of the driver airbag cover.

\* \* \* \* \*